United States Patent
Wang et al.

(10) Patent No.: US 12,152,360 B2
(45) Date of Patent: Nov. 26, 2024

(54) VIBRATORY GROUTING DRILLING RIG WITH AUXILIARY MOVING MECHANISM

(71) Applicant: SAFEKEY Engineering Technology (Zhengzhou), Ltd., Henan (CN)

(72) Inventors: Fuming Wang, Henan (CN); Xiaolong Li, Henan (CN); Yanhui Zhong, Henan (CN); Bei Zhang, Henan (CN); Yongli Chen, Henan (CN); Xianfeng Zhao, Henan (CN)

(73) Assignee: SAFEKEY Engineering Technology (Zhengzhou), Ltd., Henan (CN)

( * ) Notice: Subject to any disclaimer, the term of this patent is extended or adjusted under 35 U.S.C. 154(b) by 47 days.

(21) Appl. No.: 18/144,211

(22) Filed: May 7, 2023

(65) Prior Publication Data
US 2023/0304366 A1  Sep. 28, 2023

(30) Foreign Application Priority Data
Feb. 6, 2023  (CN) .......................... 202310067834.3

(51) Int. Cl.
*E21B 19/084*  (2006.01)
*E01C 23/02*  (2006.01)
*E02B 3/12*  (2006.01)
*E01B 27/00*  (2006.01)

(52) U.S. Cl.
CPC ............ *E02B 3/123* (2013.01); *E01C 23/025* (2013.01); *E01B 27/00* (2013.01)

(58) Field of Classification Search
CPC . E01C 23/025; E21B 7/24; E02D 7/18; E02B 3/123; E01B 27/00; Y02P 70/10
See application file for complete search history.

(56) References Cited

U.S. PATENT DOCUMENTS 5,540,295 A * 7/1996 Serrette ..................... E21B 1/02 74/61

FOREIGN PATENT DOCUMENTS

| CN | 212867392 U | * 4/2021 | ............... E21B 7/02 |
| CN | 213836634 U | * 7/2021 | ............... E02D 5/46 |

* cited by examiner

*Primary Examiner* — Thomas M Wittenschlaeger

(57) ABSTRACT

A vibratory grouting drilling rig includes: a drilling rig bracket, a moving bracket, and a driving mechanism mounted on the drilling rig bracket for driving the moving bracket to move; wherein a working bracket is slidingly mounted on the moving bracket, and a sliding direction of the working bracket is identical to a moving direction of the moving bracket; a vibratory grouting rod and a drilling rod are mounted on the working bracket; multiple flexible connectors are connected between the working bracket and the drilling rig bracket, and are arranged along the moving direction of the moving bracket; the flexible connectors go around an end of the moving bracket and are connected to the drilling rig bracket. When the moving bracket moves, the flexible connectors pull the working bracket to move relative to the moving bracket, thus providing extra drilling force.

13 Claims, 2 Drawing Sheets

VIBRATORY GROUTING DRILLING RIG WITH AUXILIARY MOVING MECHANISM

CROSS REFERENCE OF RELATED APPLICATION

The present invention claims priority under 35 U.S.C. 119(a-d) to CN 202310067834.3, filed Feb. 6, 2023.

BACKGROUND OF THE PRESENT INVENTION

Field of Invention

The present invention relates to a technical field of drilling rigs, and more particularly to a drilling rig with an auxiliary moving mechanism.

Description of Related Arts

Grouting has been widely used as an important means for repairing defects such as emptying, subsidence and leakage of roads, dams, tunnels, high-speed railways and other infrastructure. Vibratory grouting can improve the grouting environment through the vibration impact of vibrating machinery, so that the grouting slurry trends to squeeze and split the sandy soil body, which makes the sandy soil body more adaptable to the grouting, thereby reducing the permeability of the stratum and preventing piping. During vibratory grouting, the existing structure of fine sand is rapidly destroyed by vibration, leading to weak sections. The weak sections will be squeezed and split by slurry pressure, and then the slurry will rapidly penetrate along the newly generated fissures, increasing the reinforcement area of the slurry. However, during drilling, the downward force of the drilling rig is generally its self-weight, which can easily lead to insufficient drilling force, resulting in inefficient and ineffective drilling that affects the construction period.

SUMMARY OF THE PRESENT INVENTION

An object of the present invention is to solve problems of insufficient drilling force and inefficiency during drilling.

Accordingly, in order to accomplish the above objects, the present invention provides:

a vibratory grouting drilling rig with an auxiliary moving mechanism, comprising: a drilling rig bracket, a moving bracket, and a driving mechanism mounted on the drilling rig bracket for driving the moving bracket to move; wherein a working bracket is slidingly mounted on the moving bracket, and a sliding direction of the working bracket is identical to a moving direction of the moving bracket; a vibratory grouting rod and a drilling rod are mounted on the working bracket; multiple flexible connectors are connected between the working bracket and the drilling rig bracket, and are arranged along the moving direction of the moving bracket; the flexible connectors go around an end of the moving bracket and are connected to the drilling rig bracket, which are configured to pull the working bracket to move.

Preferably, the drilling rig bracket, the flexible connectors and the working bracket form a closed loop, and the moving bracket is located inside the closed loop.

Preferably, the flexible connectors are connected to both an upper end and a lower end of the working bracket; the flexible connectors go around corresponding ends of the moving bracket and are connected to the drilling rig bracket.

Preferably, the flexible connectors are a first chain and a second chain; the first chain goes around an upper end of the moving bracket and is connected to the drilling rig bracket; the second chain goes around a lower end of the moving bracket and is connected to the drilling rig bracket.

Preferably, a position of the moving bracket, which is corresponding to the first chain, is fitted with a first pulley; the first chain engages with the first pulley; a position of the moving bracket, which is corresponding to the second chain, is fitted with a second pulley; the second chain engages with the second pulley.

Preferably, each of the first chain and the second chain comprises two chains set symmetrically.

Preferably, a C-shaped bracket is mounted on the drilling rig bracket, and ends of both the first chain and the second chain are mounted on the C-shaped bracket.

Preferably, the driving mechanism comprises a hydraulic rod; a fixed end of the hydraulic rod is mounted on the drilling rig bracket, and a movable end of the hydraulic rod is connected to the moving bracket.

Preferably, a moving rail is arranged on the working bracket, and a slider is installed on the moving rail; the vibratory grouting rod and the drilling rod are horizontally installed on the slider in sequence; wherein the slider drives the drilling rod to drill a hole before moving the vibratory grouting rod to the hole, and the vibratory grouting rod vibrates to liquefy soil before grouting.

Preferably, multiple extension rods are detachably connected to an external end of the vibratory grouting rod, and each of the extension rods contains a pivot shaft; each pivot shaft is connected to an internal wall of one of the extension rods through a bearing; and end surfaces of the pivot shaft are concave and convex to cooperate with each other.

The present invention has the following beneficial effects:
I. When the moving bracket moves, the flexible connectors pull the working bracket to move relative to the moving bracket, thus providing enough drilling force to the working bracket to provide better drilling effect and improve drilling efficiency.
II. Pulleys are used to connect the work bracket and the drilling rig bracket, so that the moving bracket move faster. Furthermore, the drilling rod can move faster, so that workers can obtain the drilling situation earlier to better execute the next step, thereby improving working efficiency.
III. Both the vibratory grouting rod and the drilling rod are installed on the working bracket, which can quickly start grouting after the soil is liquefied by vibration, thus improve grouting efficiency and effect.

BRIEF DESCRIPTION OF THE DRAWINGS

In order to more clearly illustrate the technical solutions in embodiment of the present invention or prior art, the following is a brief description of accompanying drawings used for describing the embodiment or prior art. It is obvious that the accompanying drawings described below are only some of the embodiments of the present invention, and it is also possible for a person of ordinary skill in the art to obtain, without creative work, other related drawings based on the structures illustrated in the accompanying drawings.

ELEMENT REFERENCES

1—vibratory grouting rod, 2—drilling rod, 3—first pulley, 4—first chain, 5—slider; 6—moving rail, 7—drilling rig bracket, 8—second pulley, 9—working bracket, 10—second chain, 11—C-shaped bracket, 12—hydraulic rod, 13—moving bracket, 14—extension rod, 15—pivot shaft, 16—bearing.

DETAILED DESCRIPTION OF THE PREFERRED EMBODIMENT

In order to illustrate the present invention clearly, the present invention will be further described in conjunction with the accompanying drawings and embodiment.

It should be noted that all directional indications in the embodiment of the present invention are used only to explain the relative positions, movements, etc, between the components in a particular attitude; and if that particular attitude is changed, the directional indications change accordingly.

Furthermore, terms such as "first" and "second" in the present invention are for descriptive purposes only and are not to be construed as indicating or implying their relative importance or implicitly specifying the quantity of technical features indicated. Thus, the features qualified with "first" and "second" may explicitly or implicitly include at least one such feature. In the description of the present invention, "multiple" means at least two, such as two, three and more, unless otherwise expressly and specifically limited.

In the present invention, unless otherwise expressly and specifically limited, the terms such as "connect" and "fix" shall be understood in a broad sense. For example, "fix" may refer to a fixed connection, or a detachable connection, or being integrated; can refer to mechanical connection, or electrical connection; can refer to direct connection, or indirect connection through an intermediate medium; and can refer to internal connection or interaction of two components, unless otherwise expressly limited. To a person of ordinary skill in the art, the specific meaning of the above terms in the present invention can be understood on a case-by-case basis.

Figure 1:
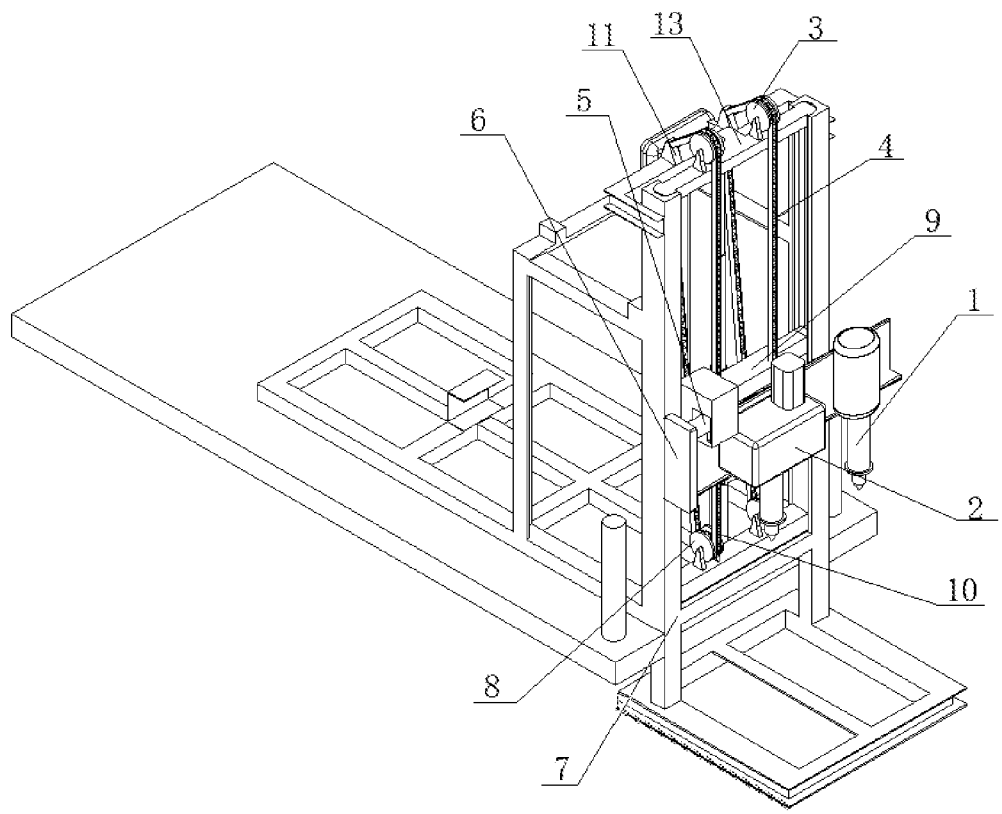
FIG. 1 is a perspective view of a vibratory grouting drilling rig according to an embodiment of the present invention.

Referring to FIG. 1, vibratory grouting drilling rig with an auxiliary moving mechanism is provided by the present invention, comprising: a drilling rig bracket 7, a moving bracket 13, and a driving mechanism mounted on the drilling rig bracket 7 for driving the moving bracket 13 to move; wherein a working bracket 9 is slidingly mounted on the moving bracket 13, and a sliding direction of the working bracket 9 is identical to a moving direction of the moving bracket 13; a vibratory grouting rod 1 and a drilling rod 2 are mounted on the working bracket 9; multiple flexible connectors are connected between the working bracket 9 and the drilling rig bracket 7, and are arranged along the moving direction of the moving bracket 13; the flexible connectors go around an end of the moving bracket 13 and are connected to the drilling rig bracket 7, which are configured to pull the working bracket 9 to move.

Specifically, according to the embodiment, when the moving bracket 13 is driven by the driving mechanism, the moving bracket 13 can drive the working bracket 9 to move synchronously, while ends of the moving bracket 13 squeeze sides of the flexible connectors. Since one end of the flexible connector is fixed to the drilling rig bracket 7, the other end will pull the working bracket 9 to move synchronously. When the moving bracket 13 moves, the working bracket 9 has a relative displacement relative to the moving bracket 13, and a displacement direction is identical to the moving direction of the moving bracket 13. When the working bracket 9 moves, in addition to the moving bracket 13, the flexible connectors also pull the working bracket 9 to move. Therefore, during drilling, the drilling force of the drilling rod 2 is formed by its self-weight as well as a pulling force of the flexible connectors applied on the working bracket 9, which is quite enough for drilling. Similarly, after drilling, the moving bracket 13 moves upwards, and the flexible connectors will pull the working bracket 9 to move upwards faster at this time, so that the workers can obtain the drilling situation earlier, thereby improving working efficiency.

Figure 2:
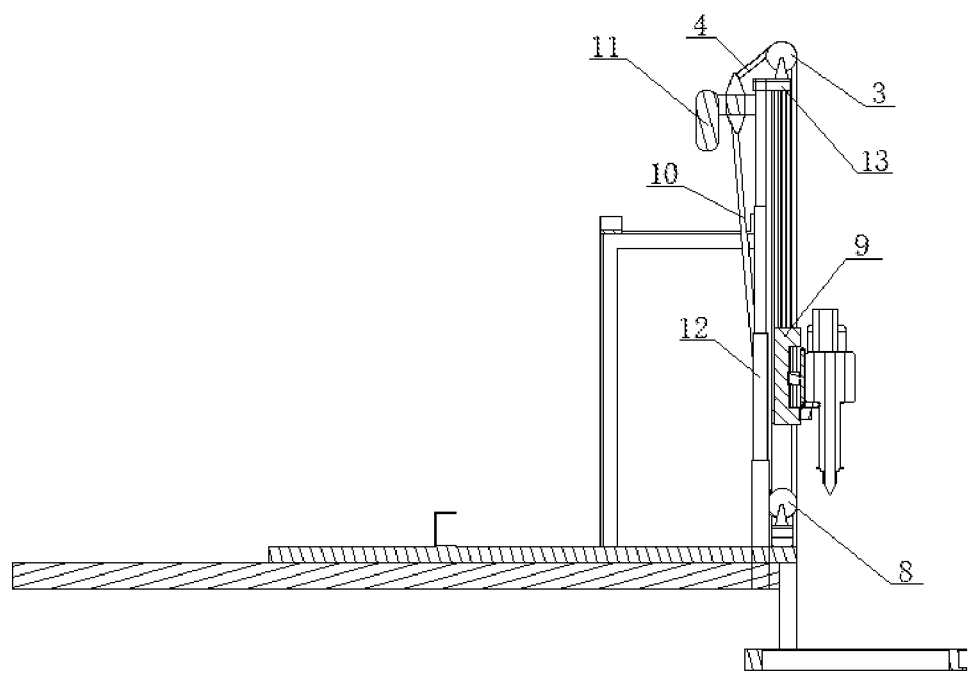
FIG. 2 is a side view of the vibratory grouting drilling rig according to the embodiment of the present invention.

Referring to FIG. 2, the drilling rig bracket 7, the flexible connectors and the working bracket 9 form a closed loop, and the moving bracket 13 is located inside the closed loop.

Specifically, according to the embodiment, since the flexible connectors are arranged in both moving directions of the moving bracket 13, the moving bracket 13 will always squeeze the flexible connectors to move, so that the flexible connectors pull the working bracket 9 to move. It is ensured that the working bracket 9 can always move relative to the moving bracket 13 when the moving bracket 13 moves.

Referring to FIG. 1, the flexible connectors are connected to both an upper end and a lower end of the working bracket 9; the flexible connectors go around corresponding ends of the moving bracket 13 and are connected to the drilling rig bracket 7. The flexible connectors are a first chain 4 and a second chain 10; the first chain 4 goes around an upper end of the moving bracket 13 and is connected to the drilling rig bracket 7; the second chain 10 goes around a lower end of the moving bracket 13 and is connected to the drilling rig bracket 7.

Specifically, according to the embodiment, when the moving bracket 13 moves upwards, it pushes the first chain 4, and the first chain 4 pulls the working bracket 9 to move upwards. When the moving bracket 13 moves downwards, it squeezes the second chain 10, and the second chain 10 pulls the working bracket 9 to move downwards.

Referring to FIG. 2, a position of the moving bracket 13, which is corresponding to the first chain 4, is fitted with a first pulley 3; the first chain 4 engages with the first pulley 3; a position of the moving bracket 13, which is corresponding to the second chain 10, is fitted with a second pulley 8; the second chain 10 engages with the second pulley 8.

Specifically, according to the embodiment, the moving bracket 13 moves to drive the first pulley 3 and the second pulley 8 to move synchronously. The first pulley 3 and the first chain 4 form a moving pulley, so do the second pulley 8 and the second chain 10. Movable ends of the formed moving pulleys are connected to the working bracket 9. It can be known through the characteristics of the moving pulley that the moving distance of the movable end of a moving pulley is twice the moving distance of the moving pulley itself, which means when the moving bracket 13 drives the first pulley 3 to move a distance of L, the moving distance of the working bracket 9 is 2L correspondingly, while a moving distance of the working bracket 9 relative to the moving bracket 13 is L. Therefore, a moving speed of the working bracket 9 is twice that of the moving bracket 13. It is similar for the second pulley 8, except for the moving direction of the working bracket 9 is different. With the foregoing structure, there is enough drilling force for the drilling rod 2 to drill, making the drilling more efficient. The drilling rig can also be moved out more quickly after drilling, making it convenient to obtain the drilling situation.

Referring to FIG. 1, each of the first chain 4 and the second chain 10 comprises two chains set symmetrically. It is more smooth and reliable to run the drilling rig by using two chains to pull the working bracket 9, which improves the stability of the equipment.

Referring to FIG. 2, a C-shaped bracket 11 is mounted on the drilling rig bracket 7, and ends of both the first chain 4 and the second chain 10 are mounted on the C-shaped bracket 11.

Specifically, according to the embodiment, the first chain 4 and the second chain 10 are mounted on the C-shaped bracket 11, which is conducive to installation and disassembly of the drilling rig, and can facilitate industrial production.

Referring to FIG. 2, the driving mechanism comprises a hydraulic rod 12; a fixed end of the hydraulic rod 12 is mounted on the drilling rig bracket 7, and a movable end of the hydraulic rod 12 is connected to the moving bracket 13. The hydraulic rod 12 can steadily drive the moving bracket 13 to move, which simplifies the assembly, lowers the cost, and makes the moving bracket 13 to move more smoothly.

Referring to FIG. 1, a moving rail 6 is arranged on the working bracket 9, and a slider 5 is installed on the moving rail 6; the vibratory grouting rod 1 and the drilling rod 2 are horizontally installed on the slider 5 in sequence; wherein the slider 5 drives the drilling rod 2 to drill a hole before moving the vibratory grouting rod 1 to the hole, and the vibratory grouting rod 1 vibrates to liquefy soil before grouting.

Specifically, according to the embodiment, after the drilling rod 2 completes its task, the slider 5 moves so that the vibratory grouting rod 1 moves to the corresponding drilled hole. Then the moving bracket 13 moves downwards so that the vibratory grouting rod 1 reaches into the drilled hole. The vibratory grouting rod 1 vibrates to liquefy the land before grouting, so as to ensure the grouting effect. Since both the vibratory grouting rod 1 and the drilling rod 2 are mounted on the working bracket 9, the vibrating grouting can start immediately after the working bracket 9 has finished drilling, which can prevent the drilled hole from collapsing and make the grouting more effective.

Figure 3:
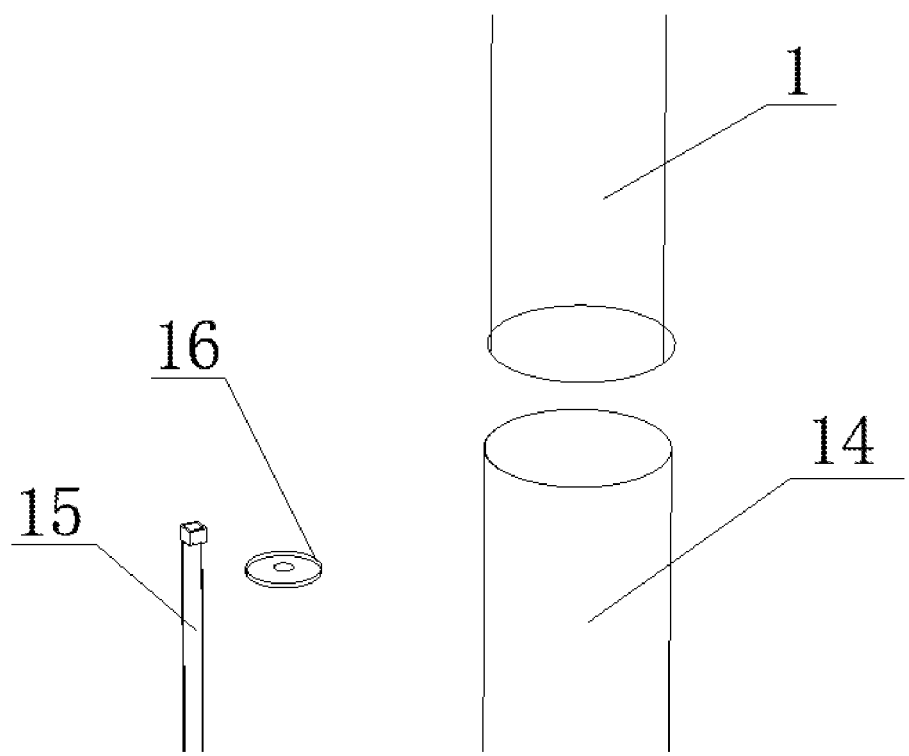
FIG. 3 is a sketch view of an extension rod according to the embodiment of the present invention.

Referring to FIG. 3, multiple extension rods 14 are detachably connected to an external end of the vibratory grouting rod 1, and each of the extension rods 14 contains a pivot shaft 15; each pivot shaft 15 is connected to an internal wall of one of the extension rods 14 through a bearing 16; and end surfaces of the pivot shaft 15 are concave and convex to cooperate with each other.

Specifically, according to the embodiment, the vibratory grouting rod 1 can be extended by the extension rods 14, thus inserting the vibratory grouting rod 1 more deeply into the borehole to enhance the grouting effect. The vibration can be transmitted smoothly through the concave-convex cooperation between the pivot shaft 15, and when the pivot shaft 15 vibrates, the vibration is transmitted to the extension rods 14 through the bearing 16, which ensures that the soil can be effectively liquefied during grouting, and improves the grouting effect.

It should be understood that the above described embodiment is only for illustrating the technical line and features of the present invention, and is intended to enable a person skilled in the art to understand the contents of the present invention and to implement it accordingly. However, the present invention is not limited to the above embodiment. All kinds of changes or modifications made within the scope of the following claims shall fall in the protection scope of the present invention.

What is claimed is:

1. A vibratory grouting drilling rig with an auxiliary moving mechanism, comprising: a drilling rig bracket (7), a moving bracket (13), and a driving mechanism mounted on the drilling rig bracket (7) for driving the moving bracket (13) to move; wherein a working bracket (9) is slidingly mounted on the moving bracket (13), and a sliding direction of the working bracket (9) is identical to a moving direction of the moving bracket (13); a vibratory grouting rod (1) and a drilling rod (2) are mounted on the working bracket (9); multiple flexible connectors are connected between the working bracket (9) and the drilling rig bracket (7), and are arranged along the moving direction of the moving bracket (13); the flexible connectors go around an end of the moving bracket (13) and are connected to the drilling rig bracket (7), which are configured to pull the working bracket (9) to move.

2. The vibratory grouting drilling rig with the auxiliary moving mechanism, as recited in claim 1, wherein the drilling rig bracket (7), the flexible connectors and the working bracket (9) form a closed loop, and the moving bracket (13) is located inside the closed loop.

3. The vibratory grouting drilling rig with the auxiliary moving mechanism, as recited in claim 1, wherein the flexible connectors are connected to both an upper end and a lower end of the working bracket (9); the flexible connectors go around corresponding ends of the moving bracket (13) and are connected to the drilling rig bracket (7).

4. The vibratory grouting drilling rig with the auxiliary moving mechanism, as recited in claim 1, wherein the flexible connectors are a first chain (4) and a second chain (10); the first chain (4) goes around an upper end of the moving bracket (13) and is connected to the drilling rig bracket (7); the second chain (10) goes around a lower end of the moving bracket (13) and is connected to the drilling rig bracket (7).

5. The vibratory grouting drilling rig with the auxiliary moving mechanism, as recited in claim 4, wherein a position of the moving bracket (13), which is corresponding to the first chain (4), is fitted with a first pulley (3); the first chain (4) engages with the first pulley (3); a position of the moving bracket (13), which is corresponding to the second chain (10), is fitted with a second pulley (8); the second chain (10) engages with the second pulley (8).

6. The vibratory grouting drilling rig with the auxiliary moving mechanism, as recited in claim 5, wherein each of the first chain (4) and the second chain (10) comprises two chains set symmetrically.

7. The vibratory grouting drilling rig with the auxiliary moving mechanism, as recited in claim 6, wherein a C-shaped bracket (11) is mounted on the drilling rig bracket (7), and ends of both the first chain (4) and the second chain (10) are mounted on the C-shaped bracket (11).

8. The vibratory grouting drilling rig with the auxiliary moving mechanism, as recited in claim 1, wherein the driving mechanism comprises a hydraulic rod (12); a fixed end of the hydraulic rod (12) is mounted on the drilling rig bracket (7), and a movable end of the hydraulic rod (12) is connected to the moving bracket (13).

9. The vibratory grouting drilling rig with the auxiliary moving mechanism, as recited in claim 7, wherein the driving mechanism comprises a hydraulic rod (12); a fixed end of the hydraulic rod (12) is mounted on the drilling rig bracket (7), and a movable end of the hydraulic rod (12) is connected to the moving bracket (13).

10. The vibratory grouting drilling rig with the auxiliary moving mechanism, as recited in claim 1, wherein a moving rail (6) is arranged on the working bracket (9), and a slider (5) is installed on the moving rail (6); the vibratory grouting rod (1) and the drilling rod (2) are horizontally installed on the slider (5) in sequence; wherein the slider (5) drives the drilling rod (2) to drill a hole before moving the vibratory grouting rod (1) to the hole, and the vibratory grouting rod (1) vibrates to liquefy soil before grouting.

11. The vibratory grouting drilling rig with the auxiliary moving mechanism, as recited in claim 7, wherein a moving rail (6) is arranged on the working bracket (9), and a slider (5) is installed on the moving rail (6); the vibratory grouting rod (1) and the drilling rod (2) are horizontally installed on the slider (5) in sequence; wherein the slider (5) drives the drilling rod (2) to drill a hole before moving the vibratory grouting rod (1) to the hole, and the vibratory grouting rod (1) vibrates to liquefy soil before grouting.

12. The vibratory grouting drilling rig with the auxiliary moving mechanism, as recited in claim 10, wherein multiple extension rods (14) are detachably connected to an external end of the vibratory grouting rod (1), and each of the extension rods (14) contains a pivot shaft (15); each pivot shaft (15) is connected to an internal wall of one of the extension rods (14) through a bearing (16); and end surfaces of the pivot shaft (15) are concave and convex to cooperate with each other.

13. The vibratory grouting drilling rig with the auxiliary moving mechanism, as recited in claim 11, wherein multiple extension rods (14) are detachably connected to an external end of the vibratory grouting rod (1), and each of the extension rods (14) contains a pivot shaft (15); each pivot shaft (15) is connected to an internal wall of one of the extension rods (14) through a bearing (16); and end surfaces of the pivot shaft (15) are concave and convex to cooperate with each other.

\* \* \* \* \*